(12) United States Patent
Blechschmidt et al.

(10) Patent No.: US 11,407,086 B2
(45) Date of Patent: Aug. 9, 2022

(54) METHOD OF MANUFACTURING AN ABRASIVE MEMBER, IN PARTICULAR ROTARY ABRASIVE DISC, AND ABRASIVE MEMBER, IN PARTICULAR ROTARY ABRASIVE DISC

(71) Applicant: DRONCO GmbH, Wunsiedel (DE)

(72) Inventors: Ralf Blechschmidt, Marktredwitz (DE); Harald Ruß, Marktredwitz (DE); Sebastian Schuster, Bayreuth (DE); Markus Schnabel, Regnitzlosau (DE); Lasse Becker, Frankenberg (DE)

(73) Assignee: DRONCO GmbH

( * ) Notice: Subject to any disclaimer, the term of this patent is extended or adjusted under 35 U.S.C. 154(b) by 575 days.

(21) Appl. No.: 16/019,504

(22) Filed: Jun. 26, 2018

(65) Prior Publication Data
US 2018/0304443 A1 Oct. 25, 2018

(30) Foreign Application Priority Data

Jun. 26, 2017 (DE) ................. 17 177 941.6

(51) Int. Cl.
*B24D 7/04* (2006.01)
*B24D 18/00* (2006.01)
(Continued)

(52) U.S. Cl.
CPC .......... *B24D 7/04* (2013.01); *B24D 3/28* (2013.01); *B24D 18/0009* (2013.01); *C09J 5/06* (2013.01); *C09K 3/14* (2013.01)

(58) Field of Classification Search
CPC ........ B24D 3/28; B24D 7/04; B24D 18/0009; C09J 5/06; C09K 3/14
See application file for complete search history.

(56) References Cited

U.S. PATENT DOCUMENTS 642,828 A 2/1900 Spohn
699,302 A 5/1902 Fowler et al.
(Continued)

FOREIGN PATENT DOCUMENTS

EP 0909612 6/2002
EP 1274544 2/2017
(Continued)

OTHER PUBLICATIONS

Schleifmittelprogramm catalog of Bosch, Jan. 1, 2013.

*Primary Examiner* — Pegah Parvini
*Assistant Examiner* — Ross J Christie
(74) *Attorney, Agent, or Firm* — McDonald Hopkins LLC

(57) ABSTRACT

A method of manufacturing an abrasive member, in particular having the general shape of a disc such as a cutting or grinding disc, comprises
 arranging a reinforcing insert or reinforcing member into a mold between a layer of curable abrasive resin compound, in particular a layer of curable abrasive granulate, a backing member such that at least a section of the reinforcing insert or reinforcing member is in direct physical contact with the curable abrasive resin compound, the reinforcing insert or reinforcing member is at least partially covered by the backing member and at least a section of the backing member is in direct physical contact with the curable abrasive resin compound;
 bonding the reinforcing insert or reinforcing member and the backing member by curing the curable abrasive resin compound, wherein the cured abrasive resin compound forms an abrasive layer of the abrasive member.

33 Claims, 4 Drawing Sheets

Figure 1:
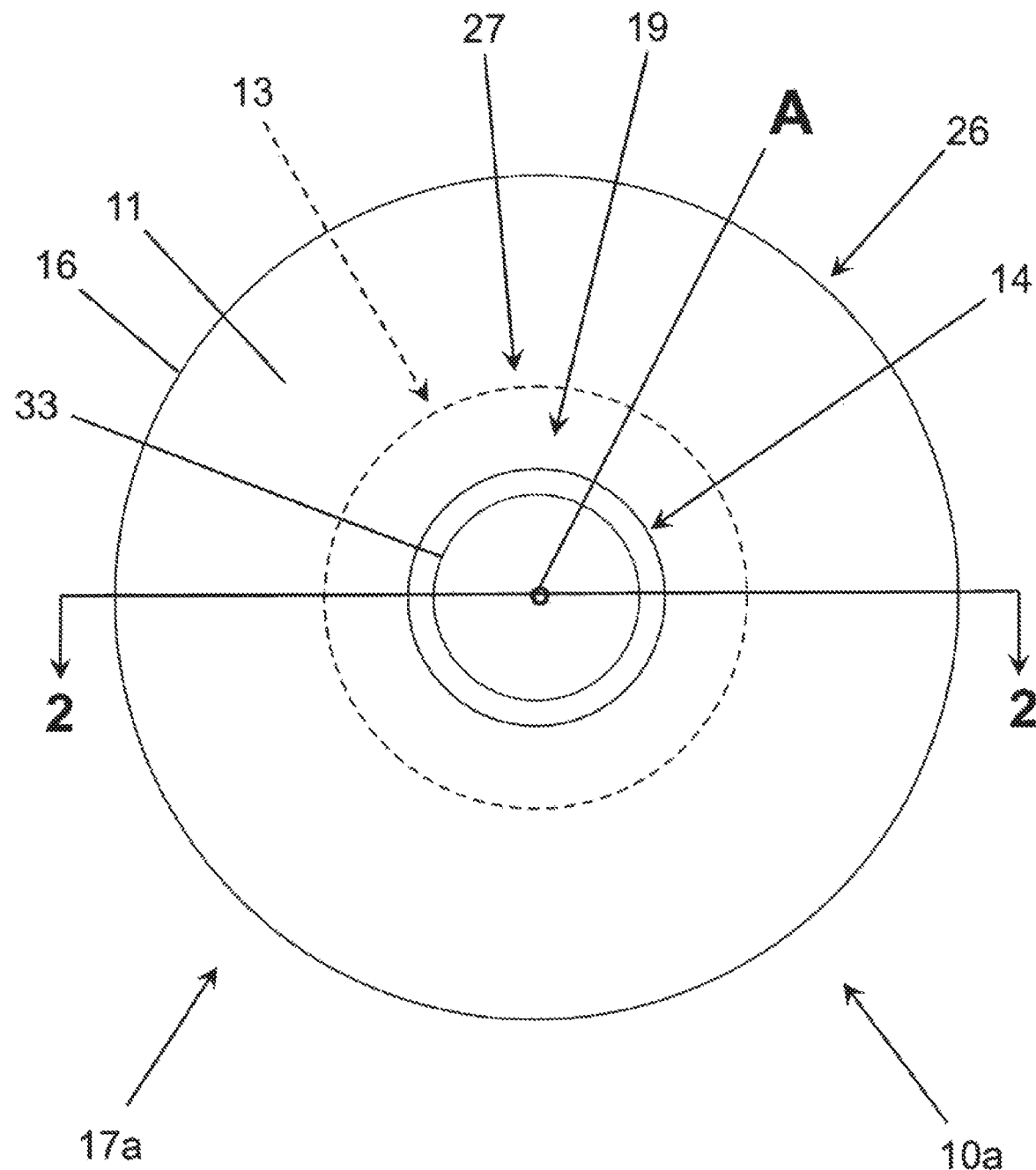

(51) Int. Cl.
    *C09J 5/06*    (2006.01)
    *C09K 3/14*    (2006.01)
    *B24D 3/28*    (2006.01)

(56)  References Cited

U.S. PATENT DOCUMENTS

| | | | |
|---|---|---|---|
| 2,316,161 A | | 4/1943 | Harvey |
| 3,262,230 A | | 7/1966 | Seymour et al. |
| 3,487,590 A | | 1/1970 | Kistler et al. |
| 4,048,765 A | | 9/1977 | Samuelson |
| 5,807,161 A | * | 9/1998 | Manor .................... B24B 23/00 |
| | | | 451/442 |
| 6,071,185 A | | 6/2000 | Genau et al. |
| 2003/0129933 A1 | | 7/2003 | Wendt et al. |
| 2011/0212674 A1 | | 9/2011 | Ficai |
| 2015/0000206 A1 | * | 1/2015 | Klett ...................... B24D 11/02 |
| | | | 51/298 |
| 2015/0196992 A1 | * | 7/2015 | Ficai ....................... B24D 5/04 |
| | | | 51/293 |
| 2016/0288295 A1 | | 10/2016 | Moos et al. |
| 2017/0274502 A1 | | 9/2017 | Ficai |

FOREIGN PATENT DOCUMENTS

| | | |
|---|---|---|
| JP | S52-116992 | 9/1977 |
| JP | S55-101373 | 8/1980 |
| JP | S57-102757 | 6/1982 |

* cited by examiner

METHOD OF MANUFACTURING AN ABRASIVE MEMBER, IN PARTICULAR ROTARY ABRASIVE DISC, AND ABRASIVE MEMBER, IN PARTICULAR ROTARY ABRASIVE DISC

CROSS REFERENCE

This application claims priority under 35 U.S.C. § 119(e) in European Patent Application No. 17 177 941.6, filed Jun. 26, 2017, the entire disclosure of which is hereby expressly incorporated herein by reference.

FIELD

The invention relates to a method of manufacturing a rotary abrasive member, in particular a resinous rotary abrasive member having the general shape of a disc such as a grinding disc or a cutting disc. The invention also relates to a resinous rotary abrasive member having the general shape of a disc such as a grinding disc or a cutting disc that is manufactured in accordance with the novel method.

BACKGROUND

The invention relates to a method of manufacturing a rotary abrasive member, in particular a resinous rotary abrasive member having the general shape of a disc such as a grinding disc or a cutting disc. The invention also relates to a resinous rotary abrasive member having the general shape of a disc such as a grinding disc or a cutting disc that is manufactured in accordance with the novel method.

Abrasive members like cutting or grinding discs of various different types are well established in the art. The known abrasive members in particular differ with respect to the type of bonding of the abrasive to a carrier or the like.

U.S. Pat. No. 4,951,423 discloses a sanding disc having two abrasive surfaces that are coated with an abrasive. Typically, the abrasive is bonded to an outer surface of the sanding disc by means of adhesion, in particular by means of gluing. An intermediate member such as a washer is arranged around a central opening of the sanding disc. The intermediate member is not embedded in an abrasive material.

CN 1028414767 discloses a rotary grinding wheel with a wheel body constructed of between 4 and 10 alternating layers of fiberglass and resinous abrasive material that includes an embedded steel ring received in an interior resinous abrasive layer having a thickness less than the abrasive layer so that resin in the abrasive layer bonds both opposite sides of the ring to a respective adjacent one of a pair of fiberglass backing layers sandwiching the resinous abrasive layer. Not only can the resin bond between each side of the ring and adjacent backing layer produce a grinding wheel having undesirably low side loading and reduced torque transmission, the maximum amount of torque transmissible from the wheel body to the ring can disadvantageously be further reduced by heat buildup during grinding wheel operation including over time due to viscoelastic properties of resin in the abrasive layer used to bond the ring to both backing layers. The net result is a relatively thick grinding wheel having undesirably reduced side loading and torque transmission characteristics which can detrimentally lead to reduced operating life or even premature sudden failure.

Present day rotary grinding or cutting discs of the state of the art are composed of at least one abrasive layer and a pair of outer backing layers of a fiberglass fabric arranged during assembly to form an annular disc body with a labeled affixed to at least one side thereafter having at least one side-mounted metal reinforcing ring coaxial with a central opening in the disc body press fit into mechanical engagement against one side of the disc formed by one of the outer backing layers and which can have a pair of side-mounted reinforcing rings respectively press fit against opposite sides of the disc formed by the outer backing layers. Each reinforcing ring can have one or more spaced apart projections, such as one or more burrs, which engage and can penetrate the outer backing layer against which the side-mounted ring is pressed during assembly which can provide more secure mechanical attachment of the ring to the disc body. Each side-mounted ring can also include an annular projection in the form of an axially extending flange or lip extending about the inner peripheral edge of the ring disposed in registry with the central opening in the disc body. Each side-mounted ring not only helps reinforce the disc body about the central opening, it also facilitates removable mounting of the disc to a rotary power tool, such as a grinder or the like.

Such discs with side-mounted rings tend to experience increased vibration during disc rotation during abrasive removal of material during surface finishing or treat-ment, which can lead to increased operator fatigue and other health problems along with limiting maximum rotational speeds, reducing abrasive material removal rates, and lowering the precision with which material can be abrasively removed during use and operation. Such discs typically require a thickness great enough to meet side loading requirements which not only can exacerbate vibration but which can also reduce operating speeds, abrasive material removal rates, and precision. While such grinding or cutting discs with side-mounted reinforcing rings have enjoyed substantial commercial success in the past, improvements nonetheless remain desirable in view of one or more of these drawbacks.

SUMMARY

It is an object of the present invention to provide rotary abrasive members, in particular a rotary abrasive disc, of improved layout and construction, in particular with respect to structural integrity and mechanical stability.

This object is achieved by a method of manufacturing an abrasive member according to claim 1 and by the abrasive member of claim 14.

A method of manufacturing a rotary abrasive member, in particular an abrasive member having the general shape of a disc, such as an annular cutting or grinding disc, comprises:

arranging a reinforcing insert (or: reinforcing member) into a mold between a layer of curable abrasive resin compound, in particular a layer of curable abrasive granulate, and a backing member such that at least a section of the reinforcing insert is in direct physical contact with the curable abrasive resin compound, the reinforcing insert is at least partially covered by the backing member and at least a section of the backing member is in direct physical contact with the curable abrasive resin compound;

bonding the reinforcing insert and the backing member by curing the curable abrasive resin compound, wherein the cured abrasive resin compound forms an abrasive layer of the abrasive member. In one such method of manufacturing the rotary abrasive member, the reinforcement insert is physically engaged with the backing member in a manner where the reinforcement insert is mechanically connected to the backing member such that the insert is fixed to the backing member.

In another such method of manufacture of the rotary abrasive member, physical engagement between the reinforcement insert and the backing member can be supplemented with an adhesive bond therebetween such as by use of a curable adhesive material like a heat curable resin thereby both mechanically and adhesively connecting the reinforcement insert to the backing member.

The invention provides a method of manufacturing an abrasive member having an integrated reinforcing member (or: reinforcing insert) that provides a means for mounting the abrasive member in particular to a rotating shaft of a rotating machine. The reinforcing member has a substantially planar shape and is firmly connected to the abrasive layer after curing by means of a substance-to-substance bond. In particular, the substance-to-substance bond is a bond provided by cured resin containing an abrasive. During manufacturing, the reinforcing member is arranged between the layer of curable abrasive resin compound that may in particular be provided by a layer of curable abrasive granulate disposed in the mold, and a substantially planar backing member, such as a sheet of a fiber fabric. One side of the reinforcing member is in direct physical contact with the curable abrasive resin compound and the opposite side of the reinforcing member is at least partially covered by the backing member. At least a section of the backing member is also in direct physical contact with the layer of curable abrasive resin compound. After curing, the substance-to-substance bond is provided in sections that were arranged to be in direct physical contact with the curable abrasive resin compound. In other words, the reinforcing member is not embedded into the abrasive layer formed after curing in a manner that the reinforcing member is completely surrounded by abrasive material but is bonded to the abrasive layer in areas that are not covered by the backing member. The substance-to-substance bond between the reinforcing member and/or the backing member on the one side and the abrasive layer on the other side provides the abrasive member with improved mechanical stability and structural integrity. The reinforcing member is firmly connected to the abrasive layer and is in particular adapted to provide a link for transmitting a mechanical force or a torque to the abrasive member.

In comparison to the layout of the known abrasive members of the state of the art as described herein before, the reinforcing member (or: reinforcing insert) is arranged in a central portion of the abrasive member rather than close to one of its outer surfaces. The reinforcing member may in particular be arranged around a center of mass of the abrasive member. This arrangement beneficially supports minimizing imbalance. In particular in case the abrasive member is configured as a revolving cutting or grinding disc, the improved layout of the abrasive member may support operation at higher rotational speed.

The firm connection in particular between the reinforcing member (or: reinforcing insert) and the abrasive layer provided by the substance-to-substance bond of cured abrasive resin compound does not primarily rely on mechanical features like burrs or projections that are adapted to penetrate into the abrasive layer to provide sufficient mechanical stability. The surfaces of the reinforcing member may thus in particular be completely even and smooth. As a consequence, the overall thickness of the abrasive member may be reduced. Abrasive members with reduced overall thickness are in particular desired in terms of higher cutting or grinding speed and/or increased precision.

The reinforcing member (or: reinforcing insert) and the backing member are preferably provided with central bores that are aligned when the backing member and the reinforcing member are arranged in the mold before curing the curable abrasive resin compound. The central bores may in particular be aligned to flush-fit. In an alternative embodiment, the reinforcing member is provided with a central bore that has a smaller diameter than the one the one of the backing member. In any case, the central bores are coaxially aligned so as to define a central opening of the abrasive member after curing of the curable abrasive resin compound.

Preferably, the reinforcing member (or: reinforcing insert) has an annular outer shape while the shape on the inside can be annular but can also have other forms. The reinforcing member is adapted to reinforce the abrasive member in a circumferential portion around the central opening. In particular, the reinforcing member may be provided by a ring made from a material that has, in particular in comparison to other components of the abrasive member, an increased mechanical strength, stability or stiffness. The reinforcing member may be adapted to be engaged by mounting means of a rotating machine capable of setting the abrasive member into rotation. The reinforcement may or may not be provided with one or more projections that project into the central opening, in particular to provide means for centering the abrasive member.

In a preferred embodiment of the invention, the backing member is positioned in the mold such that a radial inner portion of the backing member surrounding the central opening is in direct physical contact with the reinforcing member (or: reinforcing insert) and a radial outer portion of the backing member is in direct physical contact with the layer of the curable abrasive resin compound. In other words, the backing member has larger dimensions, in particular in the radial direction, than the reinforcing member. The backing member and the reinforcing member are indirectly connected via the abrasive layer formed after curing the curable abrasive resin compound.

The reinforcing member (or: reinforcing member) is preferably adapted to transmit a mechanical force, in particular a torque to the abrasive member. The reinforcing member may in particular be adapted to be engaged by mounting means of a machine for setting the abrasive member in motion, in particular in rotation. Mounting means may include clamps, screws, bolts or the like.

The reinforcing member (or: reinforcing insert) preferably includes a protrusion, in particular around a circumference around a stamped hole disposed in reinforcing member. The protrusion is arranged to at least partially penetrate into the material of the abrasive layer after curing. The protrusion is thus embedded into the material of the abrasive layer after curing and thus forms a mechanical bond with it to further improve the structural integrity and the mechanical stability of the abrasive member.

Preferably the method of manufacturing the abrasive member further includes, prior to and/or during curing, the step of applying an axial pressure to the components arranged within the mold. The method of manufacturing the abrasive member preferably includes, in particular in sequence, the steps of:

Introducing a layer of curable abrasive resin compound, in particular a layer of curable abrasive granulate into the mold;

Inserting a reinforcing insert (or: reinforcing member) into the mold such that at least a section of the reinforcing member is in direct physical contact with the curable abrasive resin compound;

Inserting a backing member into the mold such that the reinforcing member is at least partially covered by the backing member and at least a section of the backing member is in direct physical contact with the curable abrasive resin compound;

Applying an axial pressure, in particular in a direction substantially perpendicular to the substantial planar backing member, to the components arranged in the mold;

Curing the curable abrasive resin compound to form the abrasive layer of the abrasive member, wherein, during curing of the curable abrasive resin compound, the reinforcing member and the backing member is bonded to the abrasive layer by means of a substance-to-substance bond established by cured abrasive resin compound.

It is understood that the layer of curable abrasive resin compound, the reinforcing insert (or: reinforcing member) and the backing member can also be introduced into the mold in reverse order.

Preferably, axial pressure is applied to the components of the abrasive member before or during molding. In some cases, application of the axial pressure may be maintained to the components arranged in the mold during curing. In other cases, curing occurs outside the mold in an oven, while axial pressure is applied to the layered structure of components constituting the abrasive member.

The curable abrasive resin compound can in particular be thermally cured within an oven. Optionally a pre-curing or even complete curing of the components within the mold is possible. The step of thermally curing includes exposing the components arranged within the mold, in particular the curable abrasive resin compound to heat. The method of manufacturing the abrasive member preferably includes, in particular in sequence, the steps of:

Introducing a layer of curable abrasive resin compound, in particular a layer of curable abrasive granulate into the mold;

Inserting a reinforcing insert (or: reinforcing member) into the mold such that at least a section of the reinforcing member is in direct physical contact with the curable abrasive resin compound;

Inserting a backing member into the mold such that the reinforcing member is at least partially covered by the backing member and at least a section of the backing member is in direct physical contact with the curable abrasive resin compound;

Optionally applying an axial pressure, in particular in a direction substantially perpendicular to the substantial planar backing member, to the components arranged in the mold;

Thermally curing the curable abrasive resin compound to form the abrasive layer of the abrasive member, in particular by baking in an oven, wherein, during curing of the curable abrasive resin compound, the reinforcing member and the backing member are bonded to the abrasive layer by means of a substance-to-substance bond established by cured abrasive resin compound.

It is understood that the layer of curable abrasive resin compound, the reinforcing insert (or: reinforcing member) and the backing member can also be introduced into the mold in reverse order.

Preferably, a first backing member is inserted into the mold prior to introducing the curable abrasive resin compound into the mold. The method of manufacturing the abrasive member preferably includes, in particular in sequence, the steps of:

Inserting a first backing member into the mold;

Introducing a layer of curable abrasive resin compound, in particular a layer of curable abrasive granulate into the mold such that the first backing member is at least partially covered by the layer of curable abrasive resin compound;

Inserting a reinforcing insert (or: reinforcing member) into the mold such that at least a section of the reinforcing member is in direct physical contact with the curable abrasive resin compound;

Inserting a second backing member into the mold such that the reinforcing member is at least partially covered by the second backing member and at least a section of the second backing member is in direct physical contact with the curable abrasive resin compound;

Optionally applying an axial pressure, in particular in a direction substantially perpendicular to the substantial planar first and/or second backing members, to the components arranged in the mold;

Curing, in particular thermally curing, the curable abrasive resin compound to form the abrasive layer of the abrasive member, wherein, during curing of the curable abrasive resin compound, the reinforcing member, the first backing member and the second backing member are bonded to the abrasive layer by means of a substance-to-substance bond established by cured abrasive resin compound.

It is understood that the layer of curable first backing member, abrasive resin compound, the reinforcing insert (or: reinforcing member) and the second backing member can also be introduced into the mold in reverse order.

Preferably, the reinforcing member (or: reinforcing insert) is positioned in the mold in manner that the reinforcing member is located, after curing, in a central part intermediate an upper planar surface and a lower planar surface of the generally disc-shaped abrasive member. The reinforcing member may in particular provide a mounting means for mounting the abrasive member to a rotating machine. The arrangement of the reinforcing member in the central part of the abrasive member beneficially allows for minimizing imbalances and side forces when the abrasive member is rotated to perform a cutting or grinding operation.

The backing member, in particular the first and/or second backing member, is preferably made from a fiber fabric, in particular from a glass fiber fabric, preferably impregnated with phenolic resin.

Preferably, the curable abrasive resin compound, in particular the curable abrasive granulate, is a multicomponent mixture that includes at least an abrasive and a curable resin.

Preferably, the reinforcing member (or: reinforcing insert) is made from a metal or alloy.

Preferably, the curable abrasive resin compound, in particular the curable abrasive granulate includes a thermosetting synthetic polymer, preferably phenolic resin.

The invention also relates to an abrasive member, in particular cutting or grinding disc, which is manufactured according to the method as described herein before. The abrasive member includes a reinforcing member (or: reinforcing insert) that is located between an abrasive layer and a backing member. The reinforcing member is embedded in and bonded to the abrasive layer. The reinforcing member is backed at least on one side by a backing member and thus not completely surrounded by the material of the abrasive layer. The reinforcing member is located in a central part of the abrasive member, in particular close to its center of mass.

One preferred embodiment of the invention relates to an abrasive member configured as a cutting disc. The cutting disc has one single abrasive layer made from cured abrasive resin compound that is arranged between two backing members, a first and a second backing member, made from a fiber fabric, in particular resin impregnated glass fiber fabric. The backing members substantially form the planar end faces of the cutting disc. One or both backing members may also carry a label.

Preferably, the reinforcing member (or: reinforcing insert) is embedded into the abrasive member and positioned to surround a center of mass of the abrasive member.

DRAWING DESCRIPTION

Figure 2:
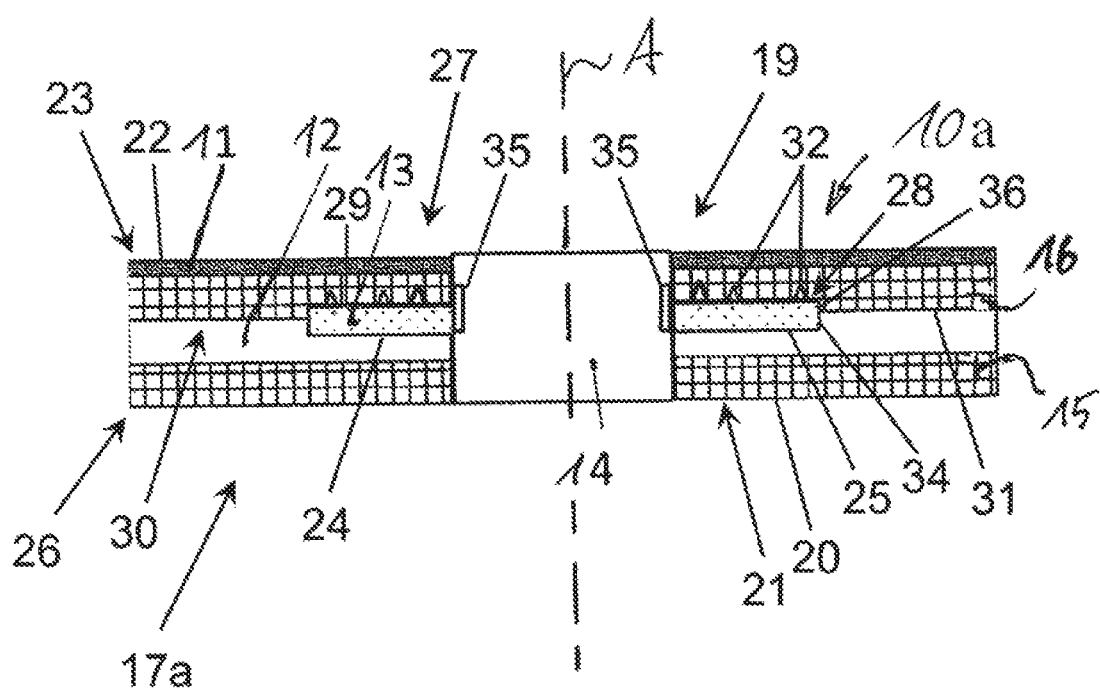
Figure 3:
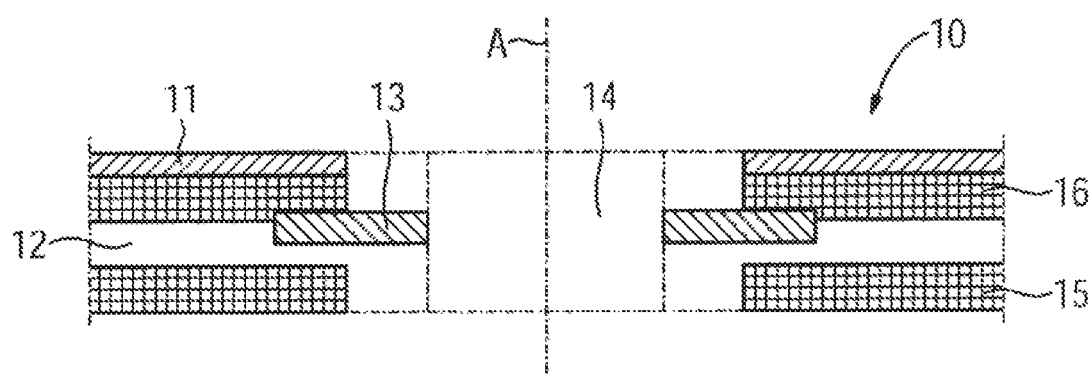
Figure 4:
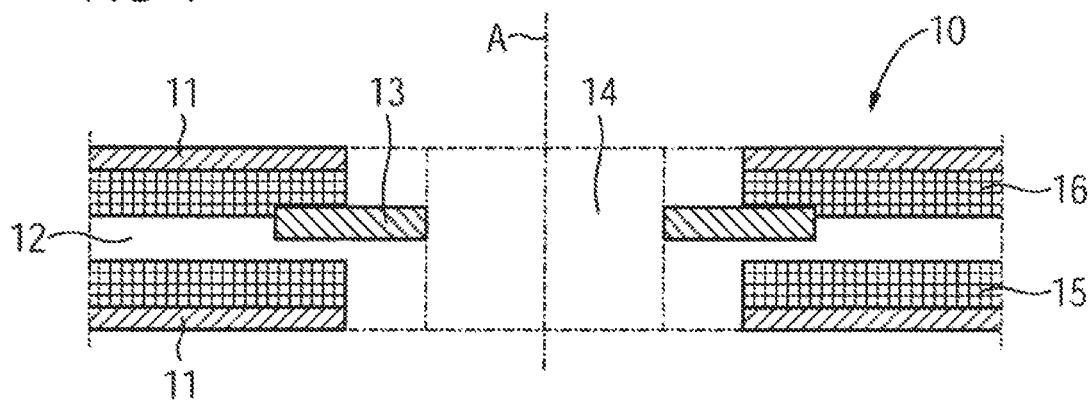
Figure 5:
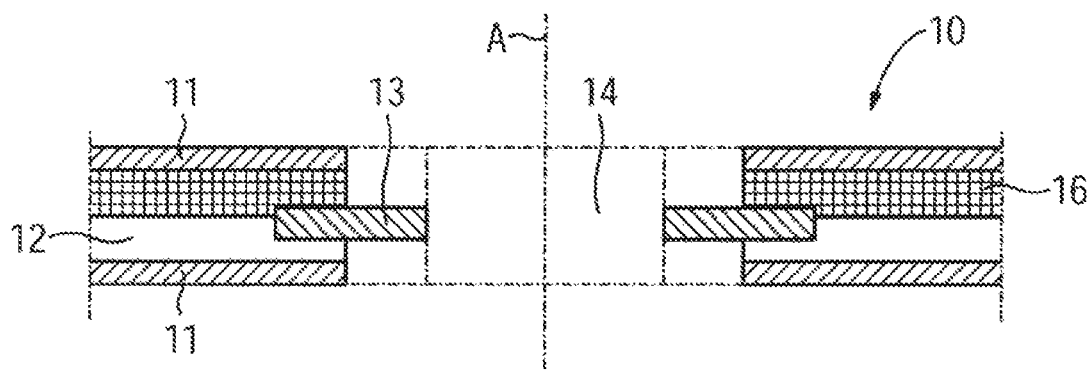

In the following, exemplary and non-limiting embodiments of invention are described in detail with reference to the enclosed figures. It shows, in schematic cross-sectional views:

FIG. 1 a top plan view of an abrasive member according to a first embodiment of the invention;

FIG. 2 a cross section of the abrasive member according to the first embodiment of the invention taken along line 2-2 of FIG. 1;

FIG. 3 an abrasive member according to a second embodiment of the invention;

FIG. 4 an abrasive member according to a third embodiment of the invention;

FIG. 5 an abrasive member according to a fourth embodiment of the invention;

Like or corresponding parts are indicated in all figures with like reference numerals.

It is understood that schematic illustration of the various embodiments of the invention shown in FIGS. 1 to 5 are not to scale.

DETAILED DESCRIPTION OF INVENTION

FIGS. 1 and 2 shows a first abrasive member 10a that is configured as an annular abrasive disc 17a cutting disc having rotational symmetric layout with respect to an axis A. The axis A extends through the center of a central opening 14 in an annular disc-shaped body 18 of the abrasive member 10a that can define a mounting hub 19 for removable mounting to a rotary power tool (not shown), such as a grinder, e.g., angle grinder, rotary drill, or the like, which rotates the disc-shaped body 18 during abrasive material removal, such as during abrasive cutting. The abrasive member 10a configured as an abrasive disc 17a that is the cutting disc is rotated around the axis A to perform a cutting operation. A direction perpendicular to the axis A is generally referred to as a radial direction.

As best shown in FIG. 2, the abrasive member 10a has a multilayer structure including, in sequence from one or a lower planar surface 20 on one side 21 to another or an upper planar surface 22 on an opposite side 23 of the generally disc-shaped abrasive member 10a, layers defined by a first backing member 15 made from a sheet of a glass fiber fabric, such as a sheet of fiberglass material, an abrasive layer 12 made from cured abrasive resin compound, a ring-shaped reinforcing member 13, like a disc-shaped central hub reinforcement insert 24, in the form of a central hub region reinforcing annular washer-shaped metal ring 25 having a stiffness stiffer than the abrasive layer 12 which is made from a metal or an alloy, a second backing member 16 made from a sheet of a glass fiber fabric, such as a sheet of fiberglass material, and a label 11 containing visually perceptible indicia. The first backing member 15, abrasive layer 12, and second backing member 16 form an annular abrasive disc body 26 in which the reinforcing member 13 is embedded. The reinforcing member 13 is sandwiched between the abrasive layer 12 and the second backing member 16. Examples of suitable curable resin compounds well suited for use in forming or making abrasive layer 12 include phenolic resins, e.g. heat-cured phenolic resins, imide or amide resins, like polyamide resins, and other types of known curable abrasive bonding agents.

The abrasive disc 17a that is the cutting disc of the exemplary embodiment depicted in FIG. 2 exhibits only a single abrasive layer 12. A radial inner portion of the abrasive layer 12 is disposed between the reinforcing member 13 and the first backing member 15. A radial outer portion of the abrasive member 12 is disposed between the first and second backing members 15, 16. There is no abrasive material disposed between the reinforcing member 13 and the second backing member 16.

The abrasive layer 12 is made from a cured abrasive resin compound. The abrasive layer 12 is firmly bonded to the reinforcing member 13, the first backing member 15 and the second backing member 16 by means of a substance-to-substance bond, a resin bond, established during curing of the abrasive resin compound and the resin-impregnated backing members 13, 15. The label 11 may be glued to the upper planar surface of the second backing member 16.

The reinforcing member 13 is physically engaged with the backing member 16 against which one side 28 or surface 29 contacts or abuts such that the reinforcing member 13 is attached via a mechanically connection with a side 30 or surface 31 of the backing member 16 facing the reinforcing member 13. The reinforcing member 13 can be formed with a plurality of axially extending spaced apart surface protrusions 32, such as the burrs shown in FIG. 1, upraised from the side 28 or surface 29 facing the backing member 16 that penetrate, become engaged, become interlocked with and/or become embedded in the backing member 16 strengthening the physical engagement and surface area of mechanical connection between the reinforcing member 13 and the backing member 16 to which the reinforcing member 13 is immovably fixed. If desired, the reinforcing member 13 can be pressed against or into the side 30 or surface 31 of the backing member 16 facing the mechanical connection strength increasing projections 32 with sufficient force to embed or depress at least part of the side 28 or surface 29 of the reinforcing member 16 into the side 30 or surface 31 of the backing member 13 such that an outer peripheral edge 34 of the reinforcing member 13 physically stops against an upraised abutment 36 formed by the depression in the backing member 16. The resultant physical connection between the reinforcing member 13 and the backing member 16 thereby advantageously provides axial engagement and support therebetween along the axially opposed contacting sides or surfaces of the reinforcing member 13 and the backing member 16 and radial engagement and support therebetween along the radially opposed contacting edge 33 of reinforcing member 13 and the abutment 34 of backing member 16 more strongly anchoring the reinforcing member 13 to the backing member 16. If desired, the physical engagement and mechanical connection between the reinforcing member 13 and backing member 16 can be supplemented using an adhesive bonding agent, such as provided by a curable resin compound, or another type of adhesive bonding agent, such as an epoxy resin, a water-soluble resin, an alcohol soluble resin, a urethane resin, or another type of bonding agent. The opposite side or surface 33 of the reinforcing member 13 faces in an opposite direction and is completely encased or submerged within the abrasive resin compound or bonding agent of the abrasive layer 12 thereby securely bonding the abrasive layer 12 to the reinforcing member 13 when the abrasive resin compound of the abrasive layer cures.

The reinforcing member 13 can also have an upraised axially extending projection 35, in the form of a flange or lip, like that shown in FIG. 2, which extends about the entire inner peripheral edge 33 of the reinforcing member 13 disposed in communication with the central opening 14 in the disc body 26 which can be configured, such as three-dimensionally shaped or formed, to facilitate removable attachment with a rotating machine or rotary power tool like an angle grinder, rotary drill, or the like. Where equipped with such an axially extending circumferential projection 35 like such a flange or lip, it can extend radially inwardly into the central opening 14 in the disc body 26 or can be flush with the inner peripheral edge of the disc body 26 defining the central opening 14.

The reinforcing member 13 provides mechanical stability by reinforcing the disc body 26 about a circumferential hub reinforcement region 27 as shown in FIG. 1 extending radially outwardly from and around the entire circumference of the central opening 14. The abrasive member 10a may be firmly mounted to a rotary shaft or spindle of a rotating machine like a rotary power tool, such as a grinder, e.g., angle grinder, or a drill, in particular by means of a coupling arrangement, e.g., a flange and locking nut assembly, a chuck, or clamps that releasably engage or couple with the abrasive member 10a in the circumferential hub reinforcement region 27 surrounding the central opening 14 that is reinforced by the reinforcing insert 13. The reinforcing member 13 is immovably fixed or grounded to the disc body for rotation in unison therewith when the reinforcing member 13 is releasably mounted, coupled or otherwise attached to the rotating machine, e.g., rotary power tool, by being releasably coupled to the rotary shaft or spindle enabling the abrasive member 10a to withstand a greater amount of torque or force during contact between the rotating abrasive member 10a during abrasive material removal such as during abrasive cutting. As a result of the reinforcing member 13 being embedded generally in the middle of the disc body 26 axially about halfway between the outer surface of the disc body 26, the abrasive member 10a is better balanced during rotation advantageously leading to smoother abrasive material removal operation resulting in less vibration being transmitted to a human operator of the rotating machine, e.g., rotary power tool, during abrasive material removal. Such a construction also produces an abrasive member 10a that is a rotary abrasive disc 17a that advantageously is more economical as it requires less material to make, is better balanced and dampens vibration, has better side loading characteristics, and which enables a thinner disc 17a to be produced that enables more precise abrasive material removal especially when the disc 17a is a cutting disc used for abrasive cutting.

In the second embodiment shown in FIG. 3, the abrasive member 10 has a reinforcing insert 13 that has a smaller inner diameter than the backing members 15, 15 and the abrasive layer 12. The reinforcing insert 14 thus project in a central portion of the abrasive member 10 in the central opening 14 to define a section of reduced diameter.

The third embodiment shown in FIG. 4 is similar to the second embodiment of FIG. 4. Both the first and the second backing member 15, 16 carry a label 11.

FIG. 5 shows a fourth embodiment of the abrasive member 10. The abrasive member 10 of the fourth embodiment 10 includes only a single backing member 15. An additional label 11 is directly disposed on the abrasive layer 12.

The abrasive member 10 depicted in FIGS. 2 to 5 is preferably manufactured according to the following method:

A curable abrasive resin compound is provided. The curable abrasive resin compound is a multicomponent mixture including at least an abrasive and a curable resin, in particular a phenolic resin. The multicomponent mixture is preferably mixed until a mixture is substantially homogenous.

A mold is provided.

In some cases, in particular when manufacturing an abrasive member 10 having two labels (see for example FIG. 4 or 5), one label 11 is first inserted in the mold.

The first backing member 15 is inserted into the mold. The curable abrasive resin compound is introduced into the mold. In case of the fourth embodiment (FIG. 5), the layer of abrasive resin compound is directly disposed on the lower label 11.

The curable abrasive resin compound forms a layer that substantially covers the first backing member 15 (see for example FIGS. 2 to 4) or the lower label 11 (see for example FIG. 5).

The reinforced member 13 is positioned on top of the layer of curable abrasive resin compound. The second backing member 16 is then positioned on top of the reinforcing insert 13 and the layer of curable abrasive resin compound such that the reinforcing insert 13 is covered by an inner radial portion of the second backing member 16 and an outer radial portion of the layer of curable abrasive resin compound is covered by an outer radial portion of the second backing member 16. An axial pressure in a direction of the axis A is applied to the components arranged in the mold. The curable abrasive resin compound is cured by exposition to heat in an oven. During curing, the abrasive layer 12 is formed from cured abrasive resin compound. A substance-to-substance bond between the reinforcing insert and the first and second backing members 15, 16 on the one side and the abrasive layer 12 on the other side is also established by curing the curable abrasive resin compound. After curing, the method of manufacturing is substantially finished.

It is claimed:

1. A method of manufacturing an abrasive member having the shape of a disc, the method comprising:
    (a) arranging a reinforcing member, adapted for releasable attachment to a rotary shaft of a rotary power tool so as to transmit mechanical force from the rotary power tool to the abrasive member, into a mold: (i) between a layer of curable abrasive resin compound and a backing member, and (ii) positioned such that: (A) at least a section of the reinforcing member is in direct physical contact with the curable abrasive resin compound, (B) the curable abrasive resin compound forms a discrete, layer that is coplanar to the backing layer, (C) the reinforcing member is at least partially covered by the backing member, and (D) at least a section of the backing member is in direct physical contact with the curable abrasive resin compound; and
    (b) bonding the reinforcing member and the backing member by curing the curable abrasive resin compound, wherein the cured abrasive resin compound forms an abrasive layer of the disc-shaped abrasive member so that the reinforcing member: (i) becomes bonded to the abrasive layer where the reinforcing member is not covered by the backing member and (ii) creates a substance-to-substance bond with the backing member where the reinforcing member is covered by the backing member.

2. The method according to claim 1, wherein the reinforcing member and the backing member are physically engaged with one another.

3. The method according to claim 1, wherein the reinforcing member and the backing member are mechanically connected to one another.

4. The method according to claim 1, wherein the reinforcing member and the backing member have central bores that are coaxial before curing the curable abrasive resin compound to define a central opening of the abrasive member.

5. The method according to claim 1, wherein the reinforcing member has an outer annular shape and is adapted to reinforce the abrasive member in a circumferential portion around the central opening.

6. The method according to claim 1, wherein the backing member is positioned in the mold such that a radial inner portion of the backing member surrounding the central opening is in direct physical contact with the reinforcing member and a radial outer portion of the backing member is in direct physical contact with the layer of the curable abrasive resin compound.

7. The method according to claim 1, wherein the mechanical force is torque from the rotary power tool to the abrasive member.

8. The method according to claim 1, wherein the reinforcing member includes a protrusion, wherein the protrusion is arranged to at least partially penetrate into the material of the abrasive layer after curing.

9. The method according to claim 1, further comprising application of an axial pressure to the components of the abrasive member within the mold before or during curing of the curable abrasive resin compound.

10. The method according to claim 1, wherein the curable abrasive resin compound is thermally cured.

11. The method according to claim 1, wherein the backing member is inserted into the mold prior to introducing the curable abrasive resin compound into the mold.

12. The method according to claim 1, wherein the reinforcing member is positioned in the mold in a manner such that the reinforcing member is located, after curing, in a central part intermediate an upper planar surface and a lower planar surface of the disc-shaped abrasive member.

13. The method according to claim 1, wherein the backing member is made from fiber fabric, the curable abrasive resin compound includes a thermosetting synthetic polymer, and the reinforcing member is made from a metal or alloy.

14. An abrasive member having the shape of a disc and comprising a cutting or grinding disc manufactured according to the method of claim 1, including a reinforcing member that is located between an abrasive layer and a backing member.

15. The abrasive member according to claim 14, wherein the reinforcing member is positioned to surround a center of mass of the abrasive member.

16. The method according to claim 5, wherein the reinforcing member has an exposed annular section extending radially into the central opening of the abrasive member, and wherein the reinforcing member has another annular section disposed radially outwardly of the exposed annular section and which is disposed between the abrasive layer and backing member.

17. The method according to claim 5, wherein the reinforcing member has an exposed section extending radially into the central opening of the abrasive member, and wherein the reinforcing member has an embedded section located radially outwardly of the exposed section, the embedded section embedded within the abrasive member by being disposed between the abrasive layer and backing member.

18. The method according to claim 17, wherein the radial extent of the embedded section is greater than the radial extent of the exposed section.

19. The method according to claim 1, further comprising application of an axial pressure to the components of the abrasive member within the mold pressing the reinforcing member against the backing member with sufficient force to form a depression in the backing member such that an outer peripheral edge of the reinforcing member stops against an upraised abutment formed by the depression in the backing member.

20. The method according to claim 13, wherein the backing member is comprised of a resin impregnated glass fiber fabric.

21. The method according to claim 13, wherein the curable abrasive resin compound is comprised of a phenolic resin.

22. The abrasive member according to claim 18, wherein the backing member comprises a first backing member and the arranging step further comprises arranging a second backing member such that the layer of curable abrasive resin compound is disposed between the first backing member and the second backing member.

23. The method according to claim 22, wherein the first backing member and the second backing member form respective planar upper and lower planar surfaces of the disc-shaped abrasive member.

24. The method according to claim 18, wherein the reinforcing member is embedded in the middle of the abrasive member axially about halfway between the upper planar surface and the lower planar surface.

25. The method according to claim 24 wherein the exposed section of the reinforcing member is annular and wherein the embedded section of the reinforcing member is annular.

26. The method according to claim 23, wherein curing of the layer of curable abrasive resin compound forms a single abrasive layer disposed between the first backing layer and the second backing layer.

27. The method according to claim 26, wherein curing of the layer of curable abrasive resin compound bonds the reinforcing member, the first backing member, and the second backing member.

28. The method according to claim 27, wherein the reinforcing member and the first backing member are physically engaged with one another.

29. The method according to claim 27, wherein the reinforcing member and the backing member are mechanically connected to one another.

30. The method according to claim 29, wherein the reinforcing member is positioned in the mold in a manner such that the reinforcing member is located, after curing, in a central part intermediate an upper planar surface and a lower planar surface of the abrasive member.

31. The method according to claim 30, wherein the reinforcing member is positioned in the mold in a manner such that the reinforcing member is located, after curing, to surround a center of mass of the abrasive member.

32. The method according to claim 26, wherein the first and second backing members are each comprised of a resin impregnated glass fiber fabric.

33. The method according to claim 32, wherein the curable abrasive resin compound is comprised of a phenolic resin.

* * * * *